Patented Apr. 26, 1932

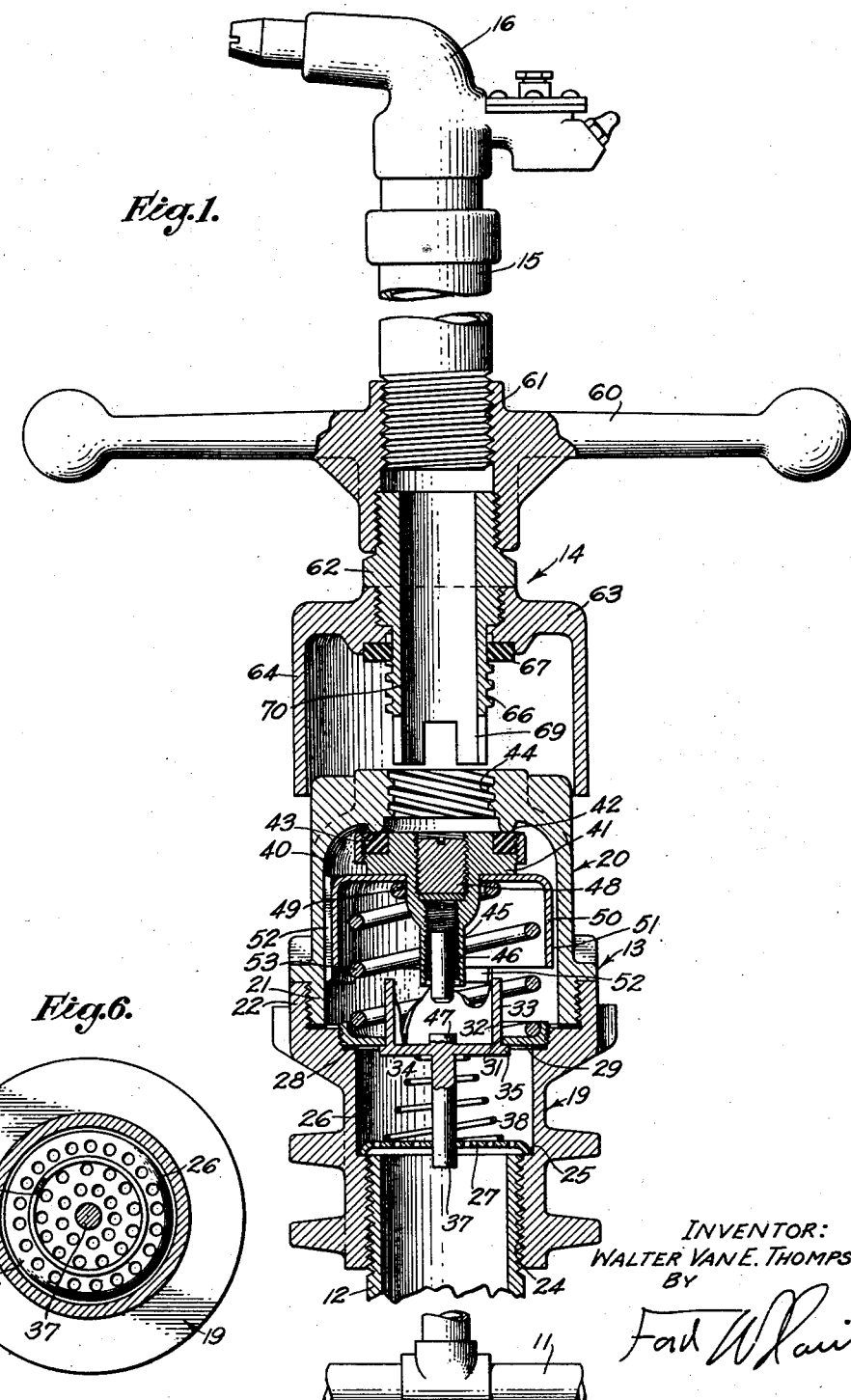

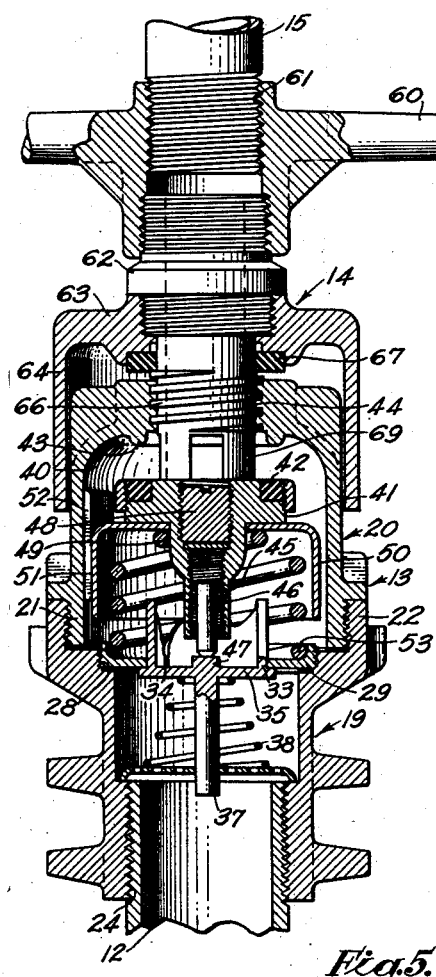
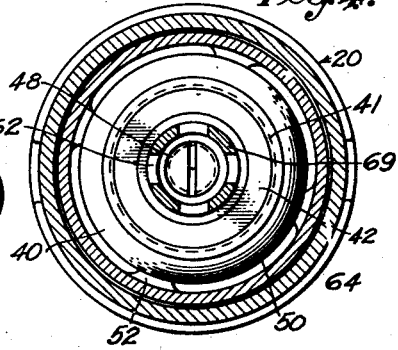
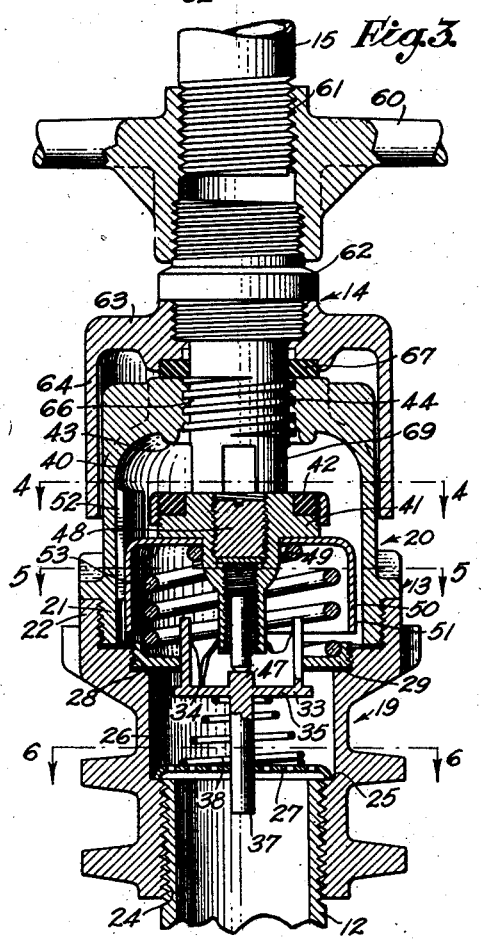
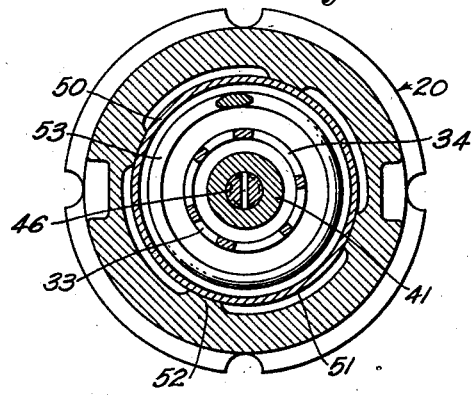
INVENTOR:
WALTER VAN E. THOMPSON,
BY
ATTORNEY.

1,855,264

UNITED STATES PATENT OFFICE

WALTER VAN E. THOMPSON, OF LOS ANGELES, CALIFORNIA, ASSIGNOR TO THOMPSON MANUFACTURING COMPANY, OF LOS ANGELES, CALIFORNIA, A CORPORATION OF CALIFORNIA

QUICK COUPLER VALVE

Application filed May 19, 1930. Serial No. 453,760.

My invention relates to a quick coupling device whereby a fluid-receiving member may be connected to a fluid-supply member, and in which a valve means in the fluid-supply member is operated when said connection is made in order to permit a flow of fluid from the supply member to the receiving member.

My invention has a marked utility in the irrigation art wherein in some instances the sprinklers employed cannot be left protruding above the surface of the ground. Typical of this is the golf course or the playground, where sprinklers would interfere with its use.

The quick coupling device of my invention includes a permanent structure secured to the supply pipe, which is located below the surface of the ground, and a removable part adapted to be removably connected to the permanent part. The permanent part includes a closure means and a valve means. The valve means is operated in consequence of an operation of the closure means, the closure means being operated when the removable member is attached to the permanent member. An adjustment means is provided whereby the valve means may be caused to be opened different amounts, thereby affording a means whereby the amount of flow through the sprinkler may be controlled.

In my present invention particular attention has been given to the designing of the movable parts within the permanent member, and the closure means and valve means are made slidable to assure an easier operation and to obtain a more economical manufacture.

It is desirable to inspect the interior of the permanent member and to, if necessary, replace any worn parts. In the preferred structure of my invention the permanent member is made in two parts which, for the purpose of identification, will be termed a primary part and a secondary part. The primary part is adapted to include the valve means, and the secondary part is adapted to include the closure means. The primary and secondary parts are removably connected together. The secondary part may therefore be removed from the primary part and the interior thereof inspected. The valve means is constructed so that it forms a seal and prevents the flow of water, but the upper portion of the valve means is exposed and permits a portion of it to be inspected. This feature of having access to the interior of the permanent member is quite valuable. It permits inspection of the internal parts without shutting down the entire water system, as would be required if it were necessary to move the complete permanent member in order to inspect it. If anything goes wrong with the permanent member, it may be inspected while the other part of the system is in operation.

In addition to the feature of permitting inspection of the internal parts of the permanent member, my invention is designed so that all of the parts, including the valve means, are removable from the upper end of the permanent member. That is to say, the secondary part of the permanent member may be removed, which gives access to the closure means thereof. The valve means contained in the primary part is so constructed that it may be removed from the primary part from the upper end thereof. If it is necessary to remove the valve means and replace any of the parts thereof, it may be done without disconnecting the primary part of the permanent member from the supply pipe.

The details of construction of the quick coupling device of my invention are of particular importance. It has been my intention to include in the quick coupler device different refinements which will obtain lower manufacturing costs and dependability of operation, and permit economical and quick repair. The various features which I consider to be valuable attributes to the broad invention will be particularly pointed out in the following description of a preferred embodiment of my invention.

Referring to the accompanying drawings in which the preferred embodiment of my invention is illustrated, Fig. 1 is an elevational view in section showing the permanent part and the removable part, the removable part being in a position ready to be connected to the permanent part.

Fig. 2 is a view similar to Fig. 1 showing the removable part engaged with the permanent part but in partly assembled position.

Fig. 3 is an elevational view in section showing the removable part completely connected or assembled to the permanent part.

Figs. 4, 5, and 6 are sections taken on the corresponding lines of Fig. 3.

Referring to the drawings in detail, the numeral 11 represents a water supply pipe having a vertically extended nipple 12, to the upper end of which the permanent part 13 of my invention is secured. Adapted to be connected to the permanent part 13 is the removable part 14 which includes as a part thereof a vertical pipe 15 and a revolvable sprinkler 16 connected to the upper part of the pipe 15.

Referring particularly to the construction of the permanent part 13, I provide a primary part including a primary section 19 and a secondary part including a secondary section 20. The primary and secondary sections are removably connected together by screwing a threaded extension 21 of the secondary section into an internally threaded flange 22 of the primary section.

The primary section 19 has a threaded bore 24 into which the upper end of the nipple 12 is screwed. Engaging an annular shoulder 25 in the passage 26 of the primary section 19 is a strainer plate 27. At the upper end of the passage 26 is a threaded opening 28 into which a valve guide 29 is screwed. The valve guide 29 has a cylindrical opening 31 through which a cylindrical portion 32 of a valve 33 is extended. The cylindrical portion 32 is provided with V-shaped slots 34 through which water may pass when the valve 33 is in one of its open positions. The valve 33 has an annular wall 35 adapted to engage the lower face of the guide 29 and to form a water-tight seal. Extending downward from the valve 33 is a guide pin 37 which extends through the strainer plate 27 and is guided thereby. Compressed between the valve 33 and the strainer plate 27 is a coil spring 38 which resiliently retains the valve in closed position. The water pressure in the passage 26 below the valve 33 cooperates with the spring 38 for holding the valve in closed position.

The section 20 provides a chamber 40 which is in communication with the passage 26 through the opening 31 when the valve 33 is in opened position. Disposed in the chamber 40 is the closure means of the invention. The closure means includes a body 41 having an upper cylindrical portion which carries a seat washer 42 which is adapted to engage an annular seat 43 which surrounds the lower end of a threaded passage 44 formed in the upper part of the secondary section 20. Extending downward from the cylindrical portion of the body 41 is a tube portion 45 which is internally threaded and threadedly receives an adjusting member 46. The adjusting member 46 may be advanced upward or downward relative to the body 41. The purpose of the adjusting member 46 is to engage the formation 47 of the valve 33 and to unseat it, as illustrated in Fig. 3. The upper end of the tube portion is sealed by a plug 48.

Placed on a cylindrical part 49 of the body 41 is a guide member 50 having a cylindrical portion 51 which engages axial ribs 52 circumferentially arranged in the chamber 40. Compressed between the cylindrical portion of the body 41 and the guide plate 29 is a spring 53 which resiliently and normally retains the closure means in seated position to close the threaded opening 44.

The removable member includes a coupler handle 60 threadedly secured at 61 to the pipe 15. Threadedly connected to the lower part of the handle 60 is a stud 62 which carries a coupler body 63. The coupler body 63 has a cylindrical wall 64 which is of such a diameter that it may extend downward over the secondary section 20. The lower end of the stud 62 projects below the upper part of the coupler body 63 and within the cylindrical wall 64 thereof, it being threaded at 66 so that it may be screwed into the threaded opening 44. A gasket 67 is provided so that when the removable member is secured to the permanent member, as in Fig. 3, the gasket 67 engages the upper face of the secondary section 20 and forms a water-tight joint. Below the threaded portion 66 of the stud 62 is an engaging portion 69 which is adapted to engage the upper face of the body 41 and to unseat it. The stud 62, as shown, has a passage 70 through it so that when the removable member is connected to the permanent member water may flow through the stud and into the pipe 15 so that it may reach the sprinkler head 16.

In Fig. 1, the removable member and the permanent member are shown ready to be connected together. The cylindrical wall 64 projects below the engagement portion 69 and therefore acts as a centralizing or guiding means so that the lower end of the stud may project through the threaded opening 44 and so that the threaded portion 66 may align therewith. The removable member is lowered from the position shown in Fig. 1 until the threaded portion 66 engages the threads of the threaded opening 44. The removable member is then rotated so that it is advanced downward. The engagement portion 69 engages the body 41 and moves it downward against the action of the spring 53. During the initial downward movement of the closure means, which includes the body 41, there is no movement of the valve 33. In fact, the closure means may move downward until the position shown in Fig. 2 is reached, the lower end of the adjusting member 46 engaging the formation 47, and then a further downward movement of the closure means, which is accomplished by a further advancement of the removable member, causes the valve 33 to be removed from its seat, as shown in Fig. 3. The amount that the valve is unseated depends upon the position of the adjusting member 46. It will be seen that the adjusting member 46 is accessible from the upper end of the permanent member through the opening 44 when the plug 48 is removed. If the adjusting member 46 were advanced downward relative to the body 41, the formation 47 would be engaged before the closure was advanced downward as far as is shown in Fig. 2. Consequently, when the closure member has been advanced a maximum, as shown in Fig. 3, the valve will be unseated a greater distance and more water may flow through the sprinkler.

In disconnecting the removable part, the closure means and valve means operate in a reverse manner. The valve 33 first closes and shuts off the water supply, and the closure means thereafter seats when it is disengaged by the engagement portion 69.

If access to the interior of the permanent member is desired, the secondary section 20 is unscrewed from the primary section 19, which gives access to the interior of the secondary section 20 and to the upper end of the primary section 19, the upper end of the valve 33 being exposed. The valve 33 performs the function of sealing the upper end of the primary section 19, and there will be no leakage when the secondary section is removed. The primary section includes a complete valve unit which constitutes a movable part of the present invention.

Should it be necessary to remove the valve 33, this may be done by removing the guide plate 29, which is threadedly secured to the primary section 19. When this is done, it will be necessary either to shut down the water supply or to have a leakage of water during the time that the valve is removed. It is not necessary, however, to disconnect the primary section 19 in order to remove the parts of the valve. This is an important feature of my invention, since it is much simpler to remove the valve guide 29 than it is to completely detach the primary section 19 from the nipple 12.

The closure means and the valve means are both slidable in the permanent member. They may move up and down without any rotative motion. This is important since the manufacture is cheaper than if the parts were threaded in the permanent member, and a distinct advantage is obtained by reason of the fact that the water pressure tends to hold the parts against their seats.

I claim as my invention:

1. In a quick coupler device, the combination of: a primary part having valve means; a secondary part having a closure means slidably mounted therein; operating means whereby said valve means is operated in consequence of an operation of said closure means; and connecting means for removably connecting together said primary and secondary parts.

2. In a quick coupler device, the combination of: a primary part adapted to be connected to a supply means; a valve guide threadedly connected to the upper end of said primary part; valve means seatable against said valve guide and retained thereby in said primary part; a secondary part secured to said primary part and having a closure means; and operating means whereby said valve means is operated subsequent to said closure means.

3. In a quick coupler device, the combination of: a primary part adapted to be connected to a supply means; a valve guide threadedly connected to the upper end of said primary part; a valve member seatable against said valve guide and retained thereby in said primary part; a plate in said primary part; a spring compressed between said valve member and said plate; a secondary part secured to said primary part and having a closure means; and operating means whereby said valve member is operated subsequent to said closure means.

4. In a quick coupler device, the combination of: a primary part including a valve means; a secondary part secured to said primary part, having an upper seat surrounding an outlet; a closure member in said secondary part and seatable on said upper seat; spring means for seating said closure member; and operating means whereby said valve means is operated as a consequence of the operation of said closure member.

5. In a quick coupler device, the combination of: a primary part including a valve means; a secondary part secured to said primary part, having an upper seat surrounding an outlet; a closure member in said secondary part and seatable on said upper seat; a cup-shaped guide member secured to said closure member and slidable in said secondary part; spring means for seating said closure member; and operating means whereby said valve means is operated as a consequence of the operation of said closure member.

6. In a quick coupler device, the combination of: a primary part adapted for connection to a supply means; a secondary part secured to said primary part; closure means slidably mounted in said secondary part; a valve guide removably connected to the upper end of said primary part; valve means seatable against said valve guide; and operating means whereby said valve means is operated in consequence of an operation of said closure means.

7. In a quick coupler device, the combination of: a permanent member adapted for connection to a supply means; closure means slidable in said permanent member; valve means slidable in said permanent member; and operating means whereby said valve means is operated in consequence of an operation of said closure means.

8. In a quick coupler device, the combination of: a primary part; valve means slidable on said primary part; a secondary part; a closure means slidable on said secondary part; operating means whereby said valve means is operated in consequence of an operation of said closure means; and connecting means for removably connecting together said primary and secondary parts.

9. In a quick coupler device, the combination of: a primary part adapted for connection to a supply means; valve means operable in said primary part; guide means in said primary part against which said valve means is adapted to seat; a secondary part secured to said primary part; closure means slidably mounted in said secondary part; and operating means whereby said valve means is operated subsequent to said closure means.

10. In a quick coupler device, the combination of: a primary part adapted to be connected to a supply means; guide means on said primary part; valve means seatable against said guide means; a secondary part secured to said primary part; closure means slidable on said secondary part; and operating means whereby said valve means is operated in consequence of an operation of said closure means.

11. In a quick coupler device, the combination of: a primary part adapted to be connected to a supply means; guide means on said primary part; valve means seatable against said guide means; a secondary part secured to said primary part; closure means slidable on said secondary part; operating means whereby said valve means is operated in consequence of an operation of said closure means; and connecting means for removably connecting together said primary and secondary parts.

12. In a quick coupler device, the combination of: a primary part including a valve; a secondary part secured to said primary part having an upper seat surrounding an outlet; a closure member in said secondary part and seatable on said upper seat; a guide member secured to said closure member and slidable in said secondary part; means for seating said closure member; and operating means whereby said valve is operated as a consequence of the operation of said closure member.

13. In a quick coupler device, the combination of: a primary part; valve means operable in said primary part; a secondary part secured to said primary part and having an outlet; walls forming a seat surrounding said outlet; a closure member in said secondary part and seatable on said seat; a guide member secured to said closure member and slidable in said secondary part; spring means for seating said closure member; and operating means whereby said valve means is operated as a consequence of the operation of said closure member.

14. In a quick coupler device, the combination of: a primary part including a valve means; a secondary part secured to said primary part and having an outlet; walls forming a seat surrounding said outlet; a closure member slidably mounted in said secondary part and being seatable on said seat; a guide member secured to said closure member; spring means for seating said closure member; and operating means for operating said valve means as a consequence of the operation of said closure member.

15. In a quick coupler device, the combination of: a primary part including a valve; a secondary part secured to said primary part and having an upper seat surrounding an outlet; a closure member in said secondary part and seatable on said upper seat; a guide member secured to said closure member and slidable therewith in said secondary part; spring means for seating said closure member; and means for operating said valve in consequence of an operation of said closure member.

16. In a quick coupler device, the combination of: a primary part including a valve; a secondary part secured to said primary part and having an upper seat surrounding an outlet; a closure member in said secondary part and seatable on said upper seat; a guide member secured to said closure member and slidable therewith in said secondary part; spring means for seating said closure member; means for operating said valve in consequence of an operation of said closure member; and connecting means for removably connecting together said primary and secondary parts.

In testimony whereof, I have hereunto set my hand at Los Angeles, California, this 13th day of May, 1930.

WALTER VAN E. THOMPSON.